S. Anderson.
Velocipede.
N⁰ 91,589.   Patented Jun. 22. 1869.

Witnesses
Rufus R. Rhoden
H. W. Jenkins

Inventor;
S. Anderson

UNITED STATES PATENT OFFICE.

SAMUEL ANDERSON, OF NEW ORLEANS, LOUISIANA.

*Letters Patent No. 91,589, dated June 22, 1869.*

IMPROVEMENT IN VELOCIPEDES.

The Schedule referred to in these Letters Patent and making part of the same.

*To all whom it may concern:*

Be it known that I, SAMUEL ANDERSON, of New Orleans, State of Louisiana, have invented a certain new and useful Improvement in Velocipedes; and I do hereby declare the following to be a full, clear, and exact description of the same, reference being had to the annexed drawing, making a part of this specification, in which—

Figure 1:
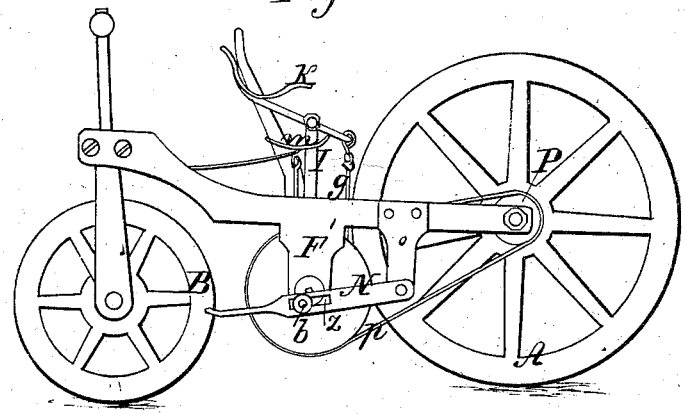

Figure 1 is an elevation showing one, and

Figure 2:
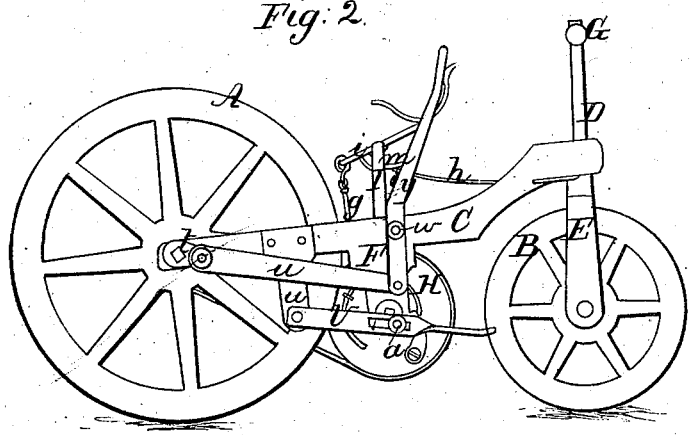

Figure 2, a similar elevation, showing the other side of my improvement.

Figure 3:
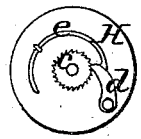

Figure 3 is a detached view of what I call my power-wheel.

The objects designed to be accomplished by my invention, and which, by actual experiment, I have ascertained can be accomplished with it, are threefold:

First, it relieves the legs of the rider of the greater part of the duty of driving the machine;

Secondly, it provides a means of making the weight of the rider a powerful co-operative agent of propulsion; and, Thirdly, it increases the speed of the machine vastly beyond what is possible with any existing arrangement of which I have any knowledge.

And my invention consists of a supplemental combined ratchet and band-wheel, that is so connected with the rider's seat and the crank-pedals and the hind wheel of the machine, which, instead of the front, I make the driving-wheel, that at regular intervals the weight of the rider can be so applied to it that an enormous measure of power for propulsive purposes is the resultant, whilst at the same time the legs of the rider co-operate to the same end, but yet in such a manner as to involve far less fatigue than is required when they alone drive the machine in its onward course. But my invention will be better understood by referring to the drawings.

A is the hind wheel of the machine, which I propose to make five feet, whilst the front wheel, B, is only three feet in diameter.

These two wheels are united by a connecting double or straddling-bar, C, which, at its rear extremity, is secured by proper journals to the two ends of the axis of wheel A, and at its other end to the front wheel B, by means of the guiding or steering vertical-rod D, which passes through it, and, being bifurcated in its lower section E, straddles the said wheel, and is secured to its axis, substantially as shown on the drawing.

A cross-arm, G, of the usual form, affords the means for turning the wheel B, and thus of steering the machine at the pleasure of the rider.

Pendent from the two branches of the bar C are two arms or standards, F F', to sustain the supplemental power-wheel H, whose axis passes through them, and is extended sufficiently on both sides to receive the cranks *a b*. This power-wheel is two feet and a half in diameter.

On the axis of wheel H, and closely contiguous to one side of it, is a pinion or ratchet-wheel, *c*.

A pawl, *d*, that is pivoted on the power-wheel H, near its perimeter, takes into the teeth of this ratchet-wheel, and is kept in contact with the same by means of a spring, *e*.

The ratchet-wheel rotates independently of the power-wheel H, except when the pawl *d* takes into the former, and then they move together.

An extension of the ratchet-wheel *c* constitutes a pulley, three inches in diameter, for a cord, *g*, which, passing around the same in two or more convolutions, so as to avoid slipping, is fastened, at one of its ends, to a spring, *h*, which is secured to the front part of connecting-bar C, and at its other end to a rear extension of the saddle-frame or supporting-bar *i*.

This saddle-frame is pivoted at the top of a vertical standard, I, projecting from one of the sections of bar C, in such manner as to constitute a vibrating lever, with one arm projecting in the direction of the rear of the machine, and the other toward its front.

On the front arm the saddle K is placed substantially as shown.

The length of the cord *g* is so regulated as to develop just sufficient tensile force in the spring *h* always to keep the saddle-frame in the position shown on the drawing, when the rider is not on the saddle; that is to say, with the rear arm drawn down to its lowest point of declension, and the front arm correspondingly elevated.

To control and fix the extent of the vibration of the lever saddle-frame *i*, a transverse bent, *m*, is secured on standard I, in such a manner as to arrest the descent of each of the two arms of the same at a prescribed point, substantially as shown.

Two pendent arms, *n o*, are secured respectively to the two sections of the connecting-bar C, in the rear of the pendants F F', to which the lever-treadles *m* and *n* are pivoted, as shown.

These treadles *m* and *n* are connected with the cranks *a* and *b*, by means of elongated slots 1 2, and hence present a means, through the agency of their projecting front extremities, by which the power-wheel H is rotated by the pressure of the rider's feet on the same.

The power-wheel H is connected with the hind wheel A, by means of a belt, *p*, which passes over it, and also over a pulley, P, that is fixed on the axis of the said wheel A, and is three inches in diameter. The parts are so adjusted, that every time the saddle-end of the lever-frame *i* is depressed, the power-wheel H will make one revolution on its axis, and also be so moved as to bring the lever-pedals *m n* just past their highest point of elevation, which will of course carry the cranks $a\ b$ just past their upper dead-points at the moment the saddle-end of lever-frame $i$ comes in contact with and is stopped by the cross-bar $m$, so that the rider has only to press on them, either by a mere muscular effort of his legs, or by throwing his weight on them, by raising himself off the seat, to give a new impetus to the power-wheel H, and through it to wheel A and the machine.

Under the action of the force derived from the weight of the rider on the saddle, motion is imparted to wheel H through the medium of the ratchet-wheel $c$; but the lever-treadles act directly on said wheel through the cranks $a\ b$, the ratchet-wheel and pulley, on which cord $g$ operates, remaining motionless whilst they act, in consequence of being placed loosely on the axis of power-wheel H.

The crank $t$, on the axis of wheel A, in connection with pitman $u$ and lever-handle $y$, which latter, it will be seen, has a pivot-fulcrum at W, affords an additional means of propulsion, and also an effective instrumentality for taking the power-wheel H off its dead-points, should it by accident get on them.

Bearing in mind that the normal position of the saddle-frame is always that shown on the drawing, when no weight is on the saddle, in virtue of the action of spring $h$, the mode of operation of my invention is very easy to understand.

The rider sits on the saddle K, and puts his feet on the treadle-levers M and N, and by alternately raising himself, and then sitting down again, he continuously works the power-wheel H, and through its medium communicates motion to the hind wheel A, and thus drives forward the velocipede at a rate proportionate to the rapidity with which he applies his weight alternately to the saddle and to the pedals, and with far less fatigue than if the propulsion were effected altogether by the muscular power of his legs, applied one at a time, in the ordinary manner in which these machines are driven, for it will be seen that both pedals occupy the same horizontal plane, and hence that both legs of the rider are simultaneously used to operate them under all circumstances and conditions whatsoever.

It will, moreover, be observed, that in consequence of the great diameter of the power-wheel H, and the distance of the pivot of the pawl $d$ from the axis of said wheel relatively to the diameter of the pulley P, an enormous measure of power is developed and applied, both by the rider's seat and by the lever-pedals, and that hence a far greater rate of sustained speed is attainable than is possible with any mechanical arrangement that has heretofore been employed in connection with velocipedes.

Having thus described my invention,

What I claim, and desire to secure by Letters Patent, is—

1. The application to a two-wheel velocipede of the supplemental power-wheel H, when the same is combined with a ratchet-wheel, $c$, pawl $d$, spring $e$, a pulley for the cord $g$, a vibrating saddle-frame, $i$, and a spring, $h$, substantially in the manner herein described.

2. The above combination and arrangement, in combination with pedals M and N, when the latter are constructed and operate substantially as herein described.

3. The combination of a power-wheel, H, and its operating-appliances with the double straddling connecting-bar O, when all the parts are constructed and operate substantially as herein described.

4. The above combination, in combination with a hand-lever, $y$, pitman $u$, and a crank, $t$, when these latter parts are constructed and arranged substantially as described.

5. The combination of a power-wheel, H, and its operative appliances, with a pulley, P, on the axis of the driving-wheel, and a belt, $p$, substantially as herein described.

S. ANDERSON.

Witnesses:
 RUFUS R. RHODES,
 H. N. JENKINS.